United States Patent
Glaser et al.

(10) Patent No.: US 6,815,908 B2
(45) Date of Patent: Nov. 9, 2004

(54) DIMMABLE SELF-OSCILLATING ELECTRONIC BALLAST FOR FLUORESCENT LAMP

(75) Inventors: John Stanley Glaser, Niskayuna, NY (US); Regan A. Zane, Superior, CO (US)

(73) Assignee: General Electric, Niskayuna, NY (US)

( * ) Notice: Subject to any disclaimer, the term of this patent is extended or adjusted under 35 U.S.C. 154(b) by 27 days.

(21) Appl. No.: 10/316,509

(22) Filed: Dec. 11, 2002

(65) Prior Publication Data

US 2004/0113564 A1 Jun. 17, 2004

(51) Int. Cl.[7] .............................................. H05B 41/391
(52) U.S. Cl. .................. 315/224; 315/209 R; 315/291; 315/DIG. 4
(58) Field of Search ............................ 315/224, 209 R, 315/225, 244, 245, 248, 283, 291, 307, DIG. 4, DIG. 5, DIG. 7

(56) References Cited

U.S. PATENT DOCUMENTS

| | | | | |
|---|---|---|---|---|
| 5,165,053 A | * | 11/1992 | Jones | 315/224 |
| 5,548,189 A | * | 8/1996 | Williams | 315/224 |
| 5,952,790 A | * | 9/1999 | Nerone et al. | 315/209 R |
| 5,965,985 A | * | 10/1999 | Nerone | 315/225 |
| 5,982,111 A | * | 11/1999 | Moisin | 315/283 |
| 6,002,210 A | * | 12/1999 | Nilssen | 315/219 |
| 6,051,934 A | * | 4/2000 | Nerone | 315/209 R |
| 6,057,648 A | * | 5/2000 | Nerone et al. | 315/209 R |
| 6,078,143 A | * | 6/2000 | Nerone | 315/209 R |
| 6,175,198 B1 | * | 1/2001 | Nerone | 315/291 |
| 6,304,041 B1 | * | 10/2001 | Farkas et al. | 315/291 |
| 6,392,365 B1 | * | 5/2002 | Zhou et al. | 315/291 |
| 2002/0113556 A1 | * | 8/2002 | Tao et al. | 315/219 |

* cited by examiner

Primary Examiner—Thuy Vinh Tran
(74) Attorney, Agent, or Firm—Fletcher Yoder

(57) ABSTRACT

A simple, low-cost ballast circuit for adjusting the lumen output of a gas lamp. A number of ballast circuits are provided for a gas lamp, such as a fluorescent lamp. Specifically, a variable resistor is provided in each of the ballast circuits. The variable resistor is included in the resonant control circuit to adjust the switching frequency of the ballast circuit, thereby controlling the lumen output or brightness of a gas lamp. Additional components, such as a fixed resistor or an inductor may be added to the ballast circuit to limit the maximum switching frequency.

45 Claims, 5 Drawing Sheets

DIMMABLE SELF-OSCILLATING ELECTRONIC BALLAST FOR FLUORESCENT LAMP

BACKGROUND OF THE INVENTION

The present invention relates generally to electronic ballasts and, more particularly, to disable self-oscillating electronic ballasts for fluorescent lamps.

Discharge lamps, such as fluorescent lamps, may implement a ballast to maintain a stable discharge current in the lamp. The ballast is placed in the lamp circuit to provide a high starting voltage to ignite the lamp followed by a current-limiting mode of operation. Conventional electronic ballasts accomplish this task through the use of active semiconductor switches and reactive passive components such as inductors and capacitors. More specifically, modern ballast circuits include a pair of serially connected switches, such as MOSFETs, which convert direct current into alternating current for supplying a resonant load circuit in which the gas discharge lamp is positioned.

In some applications, particularly integral compact fluorescent lamps (CFLs), the integration of the ballast with the lamp may demand small ballast size and low ballast cost to produce a viable product. One class of circuits that may meet these demands is the group of self-oscillating resonant ballasts, such as L-comp ballasts.

In some applications, it is further desirable to have the ability to control the brightness of the lamp. Controlled brightness may be desirable to attain energy savings or to appeal to personal lighting preferences, for example. The brightness of the lamp is controlled by controlling the lumen output in the lamp. Controlling the brightness of the lamp may be accomplished with self-oscillating ballasts. However, while high performance dimmable lamps may be attained using self-oscillating ballasts, conventional designs implement circuits which are substantially more complex and expensive compared to the non-dimmable circuits. Further, such designs may necessitate the use of an ASIC to be practical.

It may be desirable to implement a simple, low cost ballast circuit having a small size to provide a method for controlling the lumen output of the lamp driven by the ballast circuit.

BRIEF DESCRIPTION OF THE INVENTION

In accordance with one aspect of the present technique, there is provided a ballast circuit comprising: a resonant load circuit comprising an input electrically coupled to a gas discharge lamp; and a resonant control circuit coupled to the input of the resonant load circuit and configured to convert a dc signal to an ac signal and to provide the ac signal to the input of the resonant load circuit, wherein the resonant control circuit comprises a variable resistor configured to adjust the switching frequency of the ballast circuit.

In accordance with another aspect of the present technique, there is provided a gas lamp comprising: one or more bulbs; a ballast circuit coupled to the one or more bulbs and comprising a resonant load circuit comprising an input electrically coupled to the one or more bulbs, and a resonant control circuit coupled to the input of the resonant load circuit and configured to convert a dc signal to an ac signal and to provide the ac signal to the input of the resonant load circuit, wherein the resonant control circuit comprises a variable resistor configured to adjust the switching frequency of the ballast circuit; an adjustable knob coupled to the variable resistor and configured to adjust the variable resistor; and a stem configured to fit into a conventional light socket.

In accordance with a further aspect of the present technique, there is provided a method of operating a lamp comprising: adjusting the switching frequency of a resonant control circuit to produce an ac signal having an adjusted switching frequency, wherein the resonant control circuit includes a variable resistor coupled in parallel with a resonant control inductor in the resonant control circuit; and applying the signal having an adjusted switching frequency to a resonant load circuit, wherein the resonant load circuit comprises a lamp.

In accordance with still another aspect of the present technique, there is provided a system comprising: a means for adjusting the switching frequency of a resonant control circuit to produce an ac signal having an adjusted switching frequency, wherein the resonant control circuit includes a variable resistor coupled in parallel with a resonant control inductor in the resonant control circuit; and a means for applying the signal having an adjusted switching frequency to a resonant load circuit, wherein the resonant load circuit comprises a lamp.

In accordance with yet another aspect of the present technique, there is provided a method of manufacturing a ballast circuit comprising: providing a resonant control circuit having a variable resistor configured to adjust the switching frequency of the resonant control circuit; and providing a resonant load circuit configured to receive an ac signal from the resonant control circuit, wherein the ac signal has an adjusted switching frequency, and further configured to control the lumen output of a lamp in response to the ac signal.

In accordance with still another aspect of the present technique, there is provided a lamp comprising: a gas discharge lamp; a ballast circuit couple to the gas discharge lamp; an input device coupled to the ballast circuit and configured to control a lumen output of the lamp; and a stem configured to couple the ballast circuit to a power supply.

BRIEF DESCRIPTION OF THE DRAWINGS

Advantages and features of the invention may become apparent upon reading the following detailed description and upon reference to the drawings in which.

DETAILED DESCRIPTION OF SPECIFIC EMBODIMENTS

Figure 1:
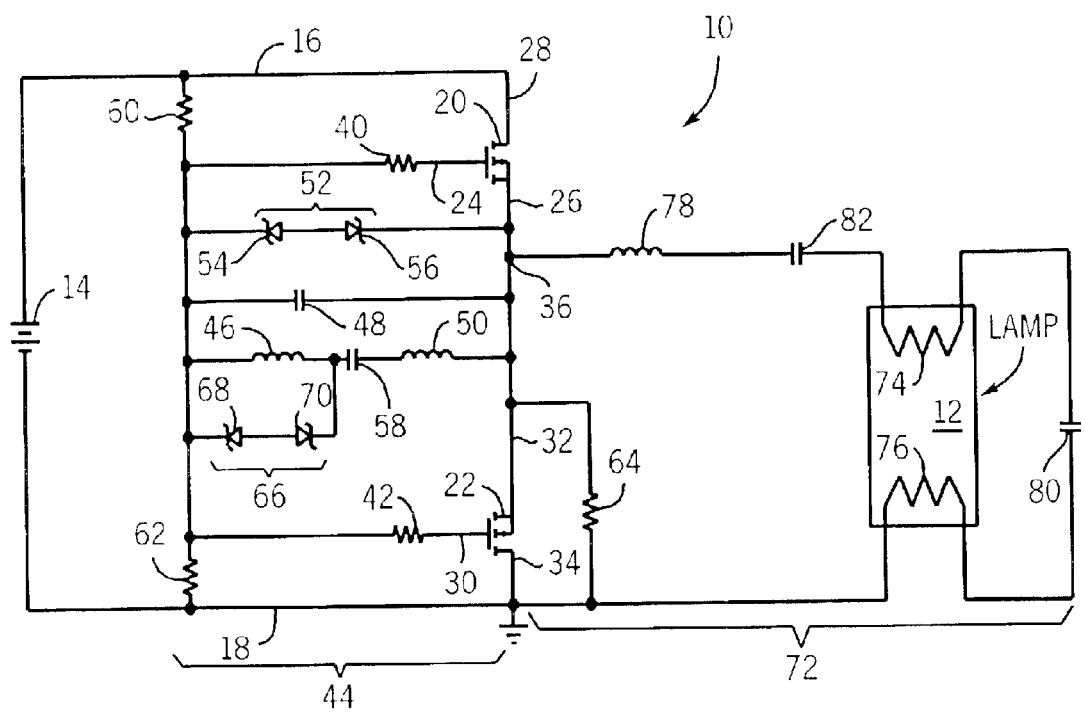
FIG. 1 is an exemplary L-comp ballast circuit for a gas discharge lamp.

FIG. 1 illustrates an exemplary ballast circuit 10 for a gas discharge lamp 12, such as an integral compact fluorescent lamp (CFL), for example. A power supply 14 is coupled between bus conductors 16 and 18 and provides dc power to switches 20 and 22. The switches 20 and 22 are coupled between the conductors 16 and 18 and are controlled to convert the dc current from the power supply 16 to ac current. The switches 20 and 22 may comprise complementary transistors, for example. In one exemplary embodiment, the switch 20 may comprise an n-channel enhancement mode MOSFET, and the switch 22 may comprise a p-channel enhancement mode MOSFET. Alternatively, the switches 20 and 22 may comprise other devices having complementary conduction modes, such as PNP and NPN Bipolar Junction Transistors, for example. The switch 20 has a respective gate 24, source 26, and drain 28. Likewise, the switch 22 has a respective gate 30, source 32, and drain 34. The voltage from the gate 24 to the source 26 of the switch 20 controls the conduction state of the switch 20. The source 26 of the switch 20 is coupled to the source 32 of the switch 22 via a common node 36. The gates 24 and 30 are coupled to each other at a control node 38. A respective gate resistor 40 and 42 may be coupled between the control node 38 and the respective gate 24 and 30 to control the switching voltage supplied to the gates 24 and 30. Alternatively, the gate resistors 40 and 42 may be omitted. The drain 28 of the switch 20 is coupled to the bus conductor 16, and the drain 34 of the switch 22 is coupled to the bus conductor 18. The bus conductor 18 may be coupled to a ground source To control the switches 20 and 22 and to facilitate the conversion of the dc current produced by the dc power supply 14 to ac current, a resonant control circuit 44 is provided. The resonant control circuit 44 may, for example, include a resonant control inductor 46 and a resonant control capacitor 48. The resonant control capacitor 48 predictably limits the rate of change of gate-to-source voltage between the common node 36 and the control node 38. Advantageously, the resonant control capacitor 48 may be used to ensure a dead time between the activation of the switches 20 and 22, for example. The resonant control circuit 44 further includes a driving inductor 50 coupled in series between the resonant control inductor 46 and the common node 36. The driving inductor 50 provides the driving energy for operation of the resonant load circuit 72, described further below.

The resonant control circuit 44 may also include a bi-directional voltage clamp 52 coupled between the common node 36 and the control node 38. The bi-directional voltage clamp 52 may comprise back-to-back Zener diodes 54 and 56, for example. The bi-directional voltage clamp 52 is implemented to clamp the positive and negative transitions of the gate-to-source voltages to a pre-determined level. The bi-directional voltage clamp 52 cooperates with the resonant control inductor 46 in such a manner that the phase angle between the fundamental frequency component of the voltage across the resonant load circuit 72 (i.e. the voltage from the common node 36 to the bus conductor 18) and the ac current in the resonant inductor 78 (described further below) approaches zero during ignition of the lamp 12.

The resonant control circuit 44 may also include a blocking capacitor 58 coupled in series between the resonant control inductor 46 and the driving inductor 50. As the circuit oscillates, the voltage on the dc blocking capacitor 58 is driven initially positive and then negative as the switches 20 and 22 are alternately activated or "turned-on." When the line voltage drops below the level at which the inverter can operate, the voltage on the blocking capacitor 58 will be just below the threshold, or turn-on voltage, of the switch 20 or 22. This residual charge sets the transconductance of the switches 20 and 22 at restart.

Further, resistors 60, 62, and 64 may be provided to initiate a faster ignition of the lamp 12 at a lower voltage than might otherwise be present without the resistors 60, 62 and 64. The resistors 60, 62, and 64 form a voltage divider that may be used to control the voltage at the common node 36 and control node 38 and the charging of the blocking capacitor 58. As can be appreciated, the voltage present at the control node 38 is limited by the resistors 60 and 62 to a portion of the voltage applied to the bus conductor 16 by the voltage supply 14. The voltage present at the common node 36 is limited by the resistors 60, 62, and 64 to a portion of the voltage applied to the bus conductor 16. Once the ballast circuit 10 reaches steady-state operation (i.e. once the lamp has been ignited), the voltage present at the control node 38 is limited through the resistors 60 and 62 and the blocking capacitor 58 is prevented from again creating a pulse to activate the switch 20.

The resonant control circuit 44 may also include a second bi-directional voltage clamp 66 coupled in parallel with the resonant control inductor 46. The bi-directional voltage clamp 66 may comprise back-to-back Zener diodes 68 and 70, for example. The Zener diodes 68 and 70 facilitate power reduction in the resonant tank if the electrical stresses become too great. Alternatively, a voltage-breakover (VBO) device, such as a diac, may be implemented instead of the voltage clamp 66.

The ac current produced by the switches 20 and 22 under the control of the resonant control circuit 44 is received by a resonant load circuit 72. The resonant load circuit 72 includes a gas discharge lamp 12 which may include resistively heated cathodes 74 and 76. The resonant load circuit 72 may comprise a resonant inductor 78 and a resonant capacitor 80. As can be appreciated, the resonant inductor 78 may share a common magnetic core with the driving inductor 50. The resonant inductor 78 is coupled between the common node 36 and a coupling capacitor 82. The coupling capacitor 82 is further coupled to one terminal of the lamp 12. The resonant capacitor 80 is shunted across terminals of the lamp 12. Further, the resonant load circuit 72 may include standard bridge capacitors (not shown) between a common lamp node and each of the bus conductor 16 and the bus conductor 18. The bridge capacitors may be used to maintain a voltage level at the common lamp node relative to the voltage at the bus conductor 16. The operation of the ballast circuit 10 will be described through the exemplary embodiments illustrated in FIGS. 2 and 4–7. As can be appreciated by those skilled in the art, the specific design of the ballast circuit 10 and the values of the components used therein may vary depending on the lamp and power supply implemented.

As can be appreciated, the common magnetic core between the coupled driving inductor 50 and the resonant inductor 78 provides a voltage across the driving inductor 50. When the resonant control circuit 44 is oscillating, the phase of the voltage across the driving inductor 50 leads the current of the resonant inductor 78 by almost 90 degrees. If the voltage across the driving inductor 50 is used to directly drive the switches 20 and 22, the voltage at the common node 36 driving the resonant load circuit 72 will also lead the current of the resonant inductor 78 by almost 90 degrees. This implies that the input impedance to the resonant load circuit 72 is almost purely inductive. Accordingly, the switching frequency $f_s$ is far above the resonant frequency $f_0$ of the ballast circuit 84. In fact, for ideal components, $f_s$ would tend toward infinity. At such high frequencies, the power output of the ballast circuit 10 may be insufficient to drive the lamp.

Accordingly, the resonant control inductor 46 and the resonant control capacitor 48 are added to lower the switching frequency $f_s$ in the ballast circuit 84. The effect of the resonant control inductor 46 and the resonant control capacitor 48 is to add a frequency dependent phase lag to the voltage across the driving inductor 50. This addition lowers the switching frequency $f_s$ and thereby provides the power levels used to drive the lamp 12 at the desired levels. The exact level of power is dependent on the values of the resonant control inductor 46 and the resonant control capacitor 48. It should be noted that the resonant control capacitor 48 may include or consist entirely of the combined parasitic gate capacitance of the switches 20 and 22, as can be appreciated by those skilled in the art.

Figure 2:
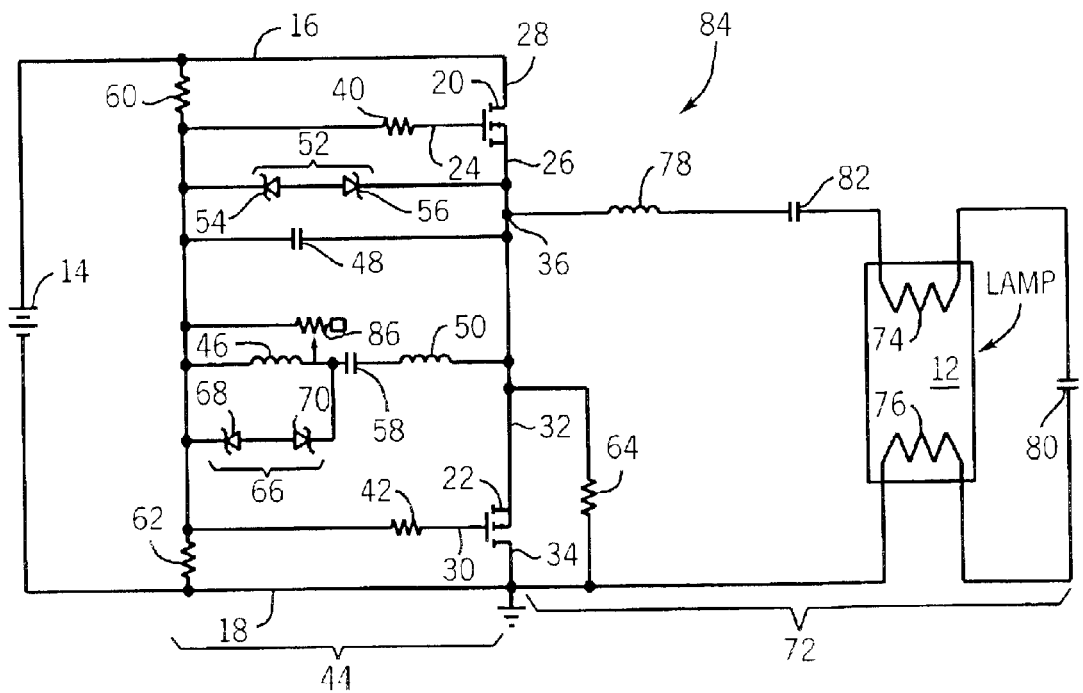
FIG. 2 is a first exemplary embodiment of a ballast circuit having a variable resistor for controlling the lumen output of a gas discharge lamp in accordance with the present techniques.

FIG. 2 illustrates an exemplary ballast circuit 84 implementing a first exemplary technique for controlling the lumen output of the lamp. For convenience, like reference numbers have been provided to refer to components previously described with respect to the ballast circuit 10 of FIG. 1. Specifically, a variable resistor 86 has been added to the ballast circuit 10 of FIG. 1 to produce the ballast circuit 84 of FIG. 2. Advantageously, the variable resistor 86 provides the ability to control the operating frequency of the resonant control circuit 44 by adjusting of the variable resistor 86.

To add adjustability to the lumen output of the lamp 12, a mechanism for adjusting the switching frequency $f_s$ of the ballast circuit 84 may be added. As the switching frequency $f_s$ is raised, the output power is lowered and the lamp 12 becomes dimmer, as can be appreciated by those skilled in the art. One technique for controlling the switching frequency $f_s$ is to make either the resonant control inductor 46 or the resonant control capacitor 48 adjustable. Disadvantageously, adjustable inductors and capacitors may be expensive. A low-cost, simple, robust technique for varying the switching frequency $f_s$ is to add a variable resistor 86 in parallel with the resonant control inductor 46. When the value of the variable resistor 86 is substantially larger than the magnitude of the impedance of the resonant control inductor 46, the variable resistor 86 has little effect, and the ballast circuit 84 operates at a minimum switching frequency $f_s$ and a maximum power. As the value of the variable resistor 86 is reduced, the phase lag of the combination of the variable resistor 86 and the resonant control inductor 46 decreases and the switching frequency $f_s$ of the ballast circuit 84 increases. As previously described, increasing the switching frequency $f_s$ of the ballast circuit 84 reduces the power to the lamp 12 and the lumen output of the lamp 12. Advantageously, the present embodiment of the ballast circuit 84 provides a simple and inexpensive circuit for providing a dimmable lamp.

Figure 3:
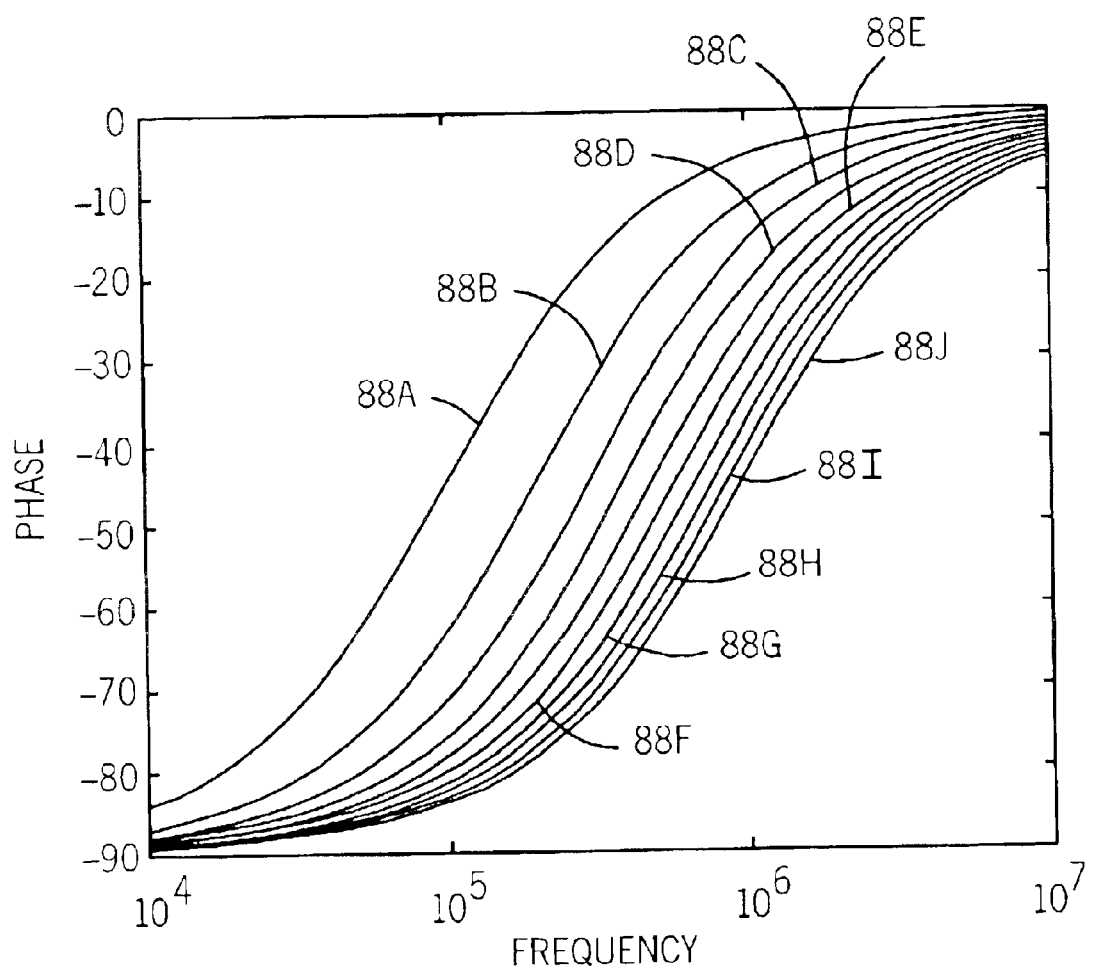
FIG. 3 is a graphical illustration of the phase versus frequency response of the circuit illustrated in FIG. 2 for a number of resistor values.

FIG. 3 illustrates the effect of adjusting the variable resistor 86 in the ballast circuit 84 of FIG. 2. Specifically, the phase of the combination of the variable resistor 86 and the resonant control inductor 46 is illustrated with respect to frequency $f_s$. Each contour 88A–88J illustrates the phase versus frequency response for a different variable resistance value. The contours 88B–88I illustrate various responses for variable resistor values 86 in between the resistance illustrated in contour 88A and contour 88J.

Figure 4:
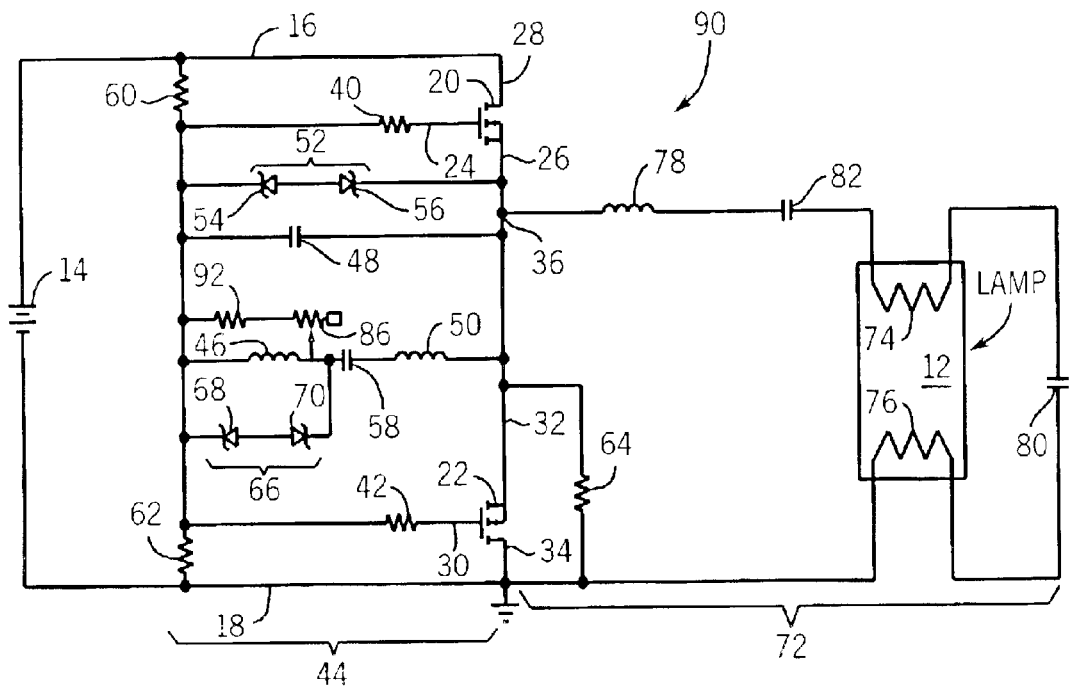
FIG. 4 is a second exemplary embodiment of a ballast circuit having a variable resistor for controlling the lumen output of a gas discharge lamp in accordance with the present techniques.

FIG. 4 illustrates an alternate embodiment of the ballast circuit 84 illustrated in FIG. 2. Accordingly, an alternate dimmable ballast circuit 90 is illustrated. The ballast circuit 90 includes a variable resistor 86 coupled in series with a fixed resistor 92. The combination of the variable resistor 86 and the fixed resistor 92 is coupled in parallel with the resonant control inductor 46. Advantageously, by adding the fixed resistor 92 to the ballast circuit 84 to produce the ballast circuit 90, a mechanism for limiting the maximum switching frequency $f_s$ of the ballast circuit 90 is provided. By adding the fixed resistor 92, the switching frequency $f_s$ can be limited to prevent the lamp 12 from being unintentionally extinguished, rather than simply dimmed.

Figure 5:
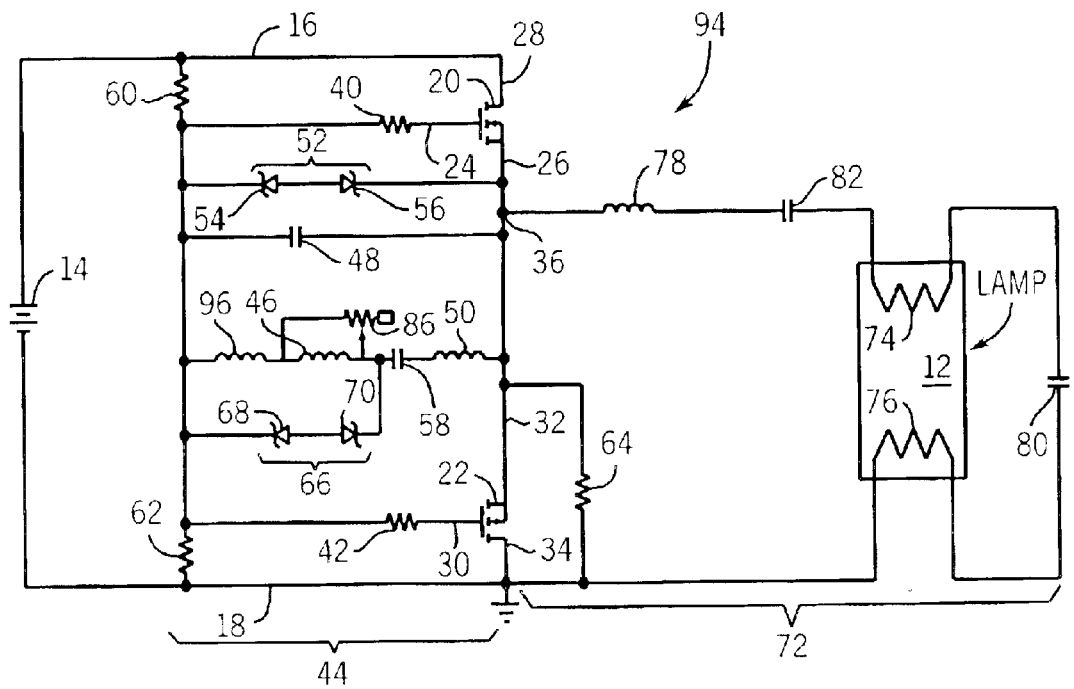
FIG. 5 is a third exemplary embodiment of a ballast circuit having a variable resistor for controlling the lumen output of a gas discharge lamp in accordance with the present techniques.

FIG. 5 illustrates an alternate embodiment of the ballast circuit 90 illustrated in FIG. 4. Accordingly, a dimmable ballast circuit 94 with an alternate mechanism for limiting the maximum switching frequency $f_s$ is illustrated. Rather than providing a fixed resistor 92 (FIG. 4), an inductor 96 is provided. The inductor 96 is not coupled in parallel with the variable resistor 86, and therefore, it always generates a phase shift. Because there will always be some phase shift, the maximum switching frequency $f_s$ is limited.

Figure 6:
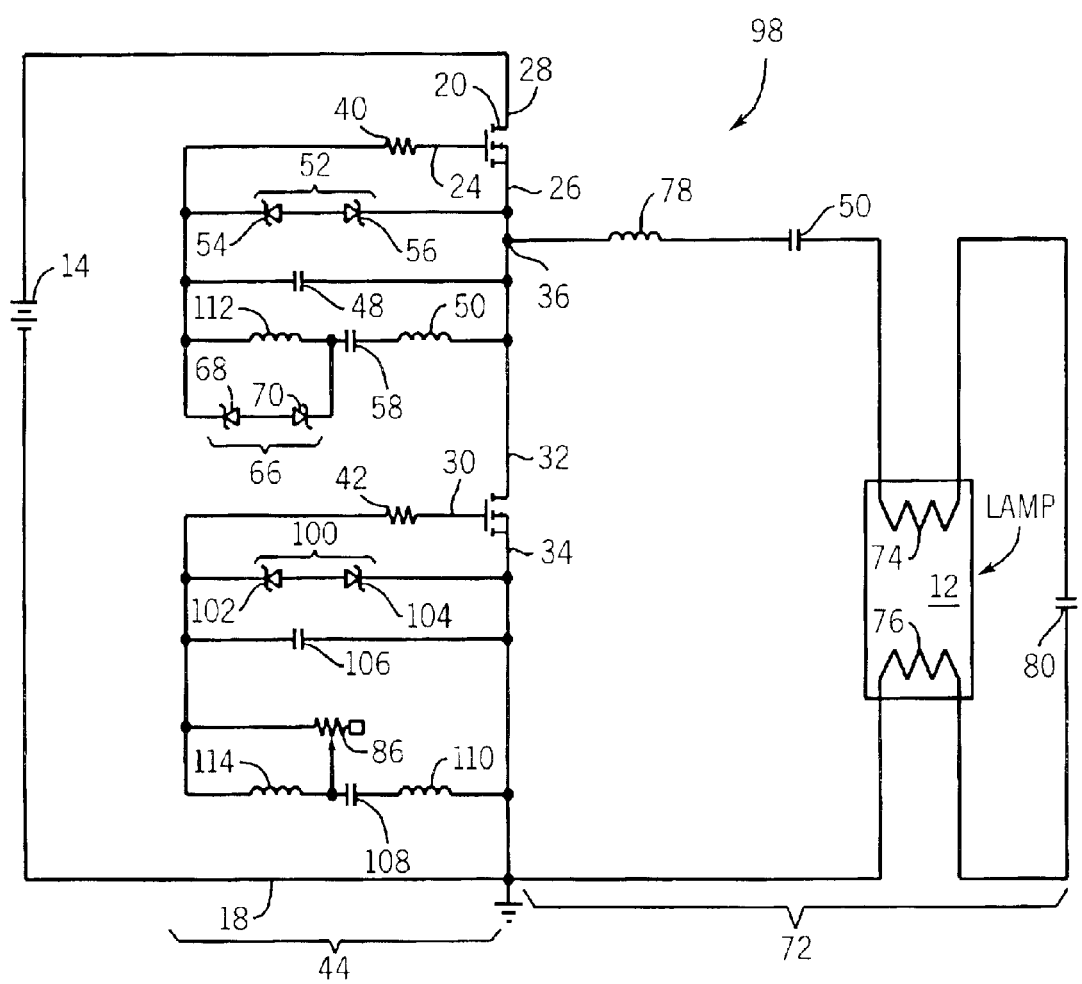
FIG. 6 is a fourth exemplary embodiment of a ballast circuit having a variable resistor for controlling the lumen output of a gas discharge lamp in accordance with the present techniques.

FIG. 6 illustrates an alternate embodiment of the ballast circuit 10 in FIG. 1 with a similar method of controlling the lumen output as in the ballast circuit 84 in FIG. 2 with the exception of the types of switches 20 and 22 implemented. Accordingly, a non-complementary dimmable ballast circuit 98 is illustrated. As can be appreciated, the switches 20 and 22 of the ballast circuit 98 may both be n-channel enhancement mode MOSFETs, for example. To provide for the variation in controlling the non-complementary switching, a bi-directional voltage clamp 100 is provided for the switch 22. The voltage claim 100 may include back-to-back Zener diodes 102 and 104, for example. The values of the back-to-back Zener diodes 102 and 104 may be the same as the values of the back-to-back Zener diodes 54 and 56, for example. Further, a second resonant control capacitor 106 is provided for the switch 22. The resonant control capacitor 106 may have the same value as the resonant control capacitor 48, for example. Still further, a second blocking capacitor 108 and a second driving inductor 110 may be added for the switch 22. The second blocking capacitor 108 and the second driving inductor 110 may have the same values as the blocking capacitor 58 and the driving inductor 50, for example. The second driving inductor 110 shares a common magnetic core with the first driving inductor 50 and the resonant inductor 78. When driving non-complementary devices connected in the fashion indicated, the polarity of the second driving inductor 110 should be reversed relative to the first driving inductor 50. The resistors 60, 62 and 64 of the ballast circuit 10 (FIG. 1) have also been removed. Finally, the resonant inductor 46 of the ballast circuit 10 has been replaced with a pair of tightly coupled resonant inductors 112 and 114. When driving non-complementary devices connected in the fashion indicated in FIG. 6, the polarity of the second inductor 114 should be reversed relative to the polarity of the first driving inductor 112. Due to the coupling of the resonant inductors 112 and 114, the effect of the variable resistor 86, which is connected in parallel with the resonant inductor 114, is felt in both of the resonant inductors 112 and 114. Alternatively, the variable resistor 86 could also be connected in parallel with the resonant inductor 112. Thus, the power to the lamp 12 is advantageously controlled, as previously described.

Figure 7:
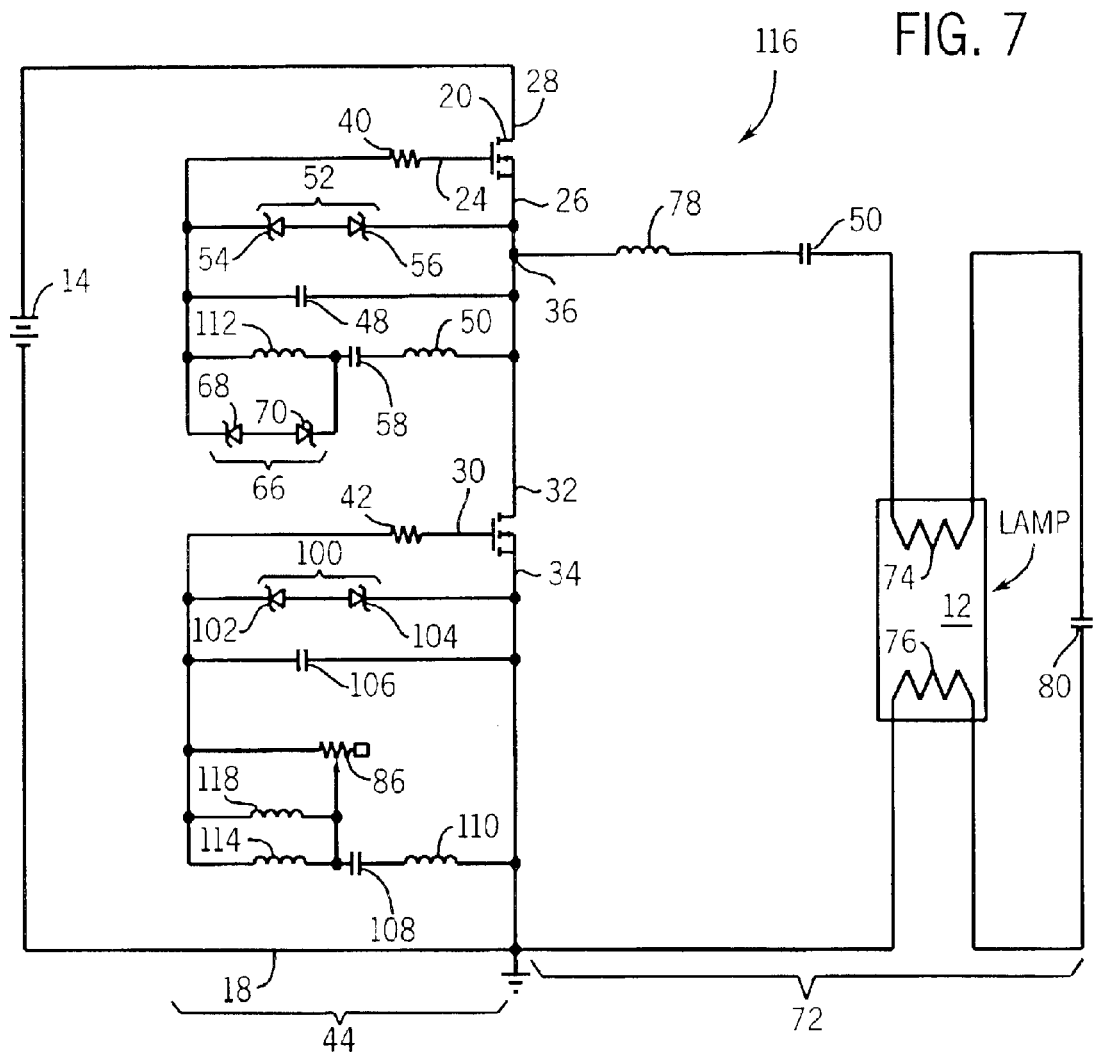
FIG. 7 is a fifth exemplary embodiment of a ballast circuit having a variable resistor for controlling the lumen output of a gas discharge lamp in accordance with the present techniques.

FIG. 7 illustrates an alternate embodiment of the non-complementary ballast circuit 98 illustrated in FIG. 6. Accordingly, an alternate dimmable non-complementary ballast circuit 116 is illustrated. In the ballast circuit 116, a third tightly coupled resonant control inductor 118 is added to the pair of tightly coupled resonant control inductors 112 and 114, previously described. The resonant control inductor 118 is coupled in parallel to each of the resonant control inductors 112 and 114. The effect of the variable resistor 86 that is connected in parallel with the resonant inductor 118, is felt in both of the resonant inductors 112 and 114. An advantage of the third winding (i.e. resonant inductor 118) is that it provides galvanic isolation between the variable resistor 86 and the rest of the ballast. This can provide added safety of operation by reducing the likelihood of electrical shock during failure conditions, and can also reduce the potential for electromagnetic interference coupled to the user input that may be physically coupled to the variable resistor 86. Alternatively, a similar effect could be achieved with the use of complementary switches by connecting a second winding to the resonant control inductor 46 and connecting the variable resitor 86 in parallel with the second winding. As can be appreciated, the non-complementary embodiments of the ballast circuit 98 and 116 illustrated in FIGS. 6 and 7 may be advantageous for higher power applications where the dissipation of a p-channel MOSFET may be impracticably high, or in the absence of p-channel MOSFETs in general.

Figure 8:
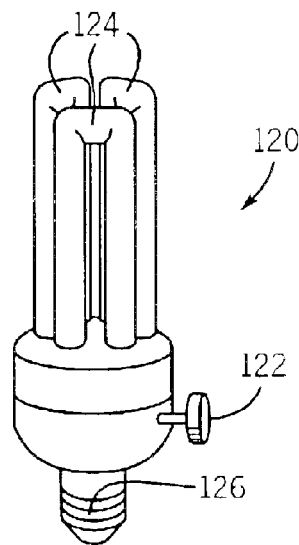
FIG. 8 is an exemplary gas lamp having an adjustable knob for controlling the lumen output of the lamp in accordance with the present techniques.

FIG. 8 illustrates an exemplary fluorescent lamp 120 having an adjustable knob 122 that allows a user to adjust the light level of the lamp 120. The fluorescent lamp 120 includes one or more bulbs 124 and a conventional lamp stem 126 such that the lamp 120 is configured to be coupled to a conventional light socket. Advantageously, the lamp 120 may include one of the exemplary embodiments of the ballast circuits described above. In one exemplary embodiment, the adjustable knob 122 may be coupled to the adjustable resistor 86 inside of the lamp 120. Alternatively, the adjustable knob 122 may be coupled to any mechanism configured to control the lumen output and thus the brightness of the lamp 120. Further, the adjustable knob 122 may comprise any other suitable mechanism for selecting or adjusting the brightness of the lamp 120, such as push buttons or touch pads that allow for user input of a desired brightness level. Thus, there is provided an adjustable lamp 120 that does not require a special socket or an external dimmer to facilitate the adjustment of the light level. That is to say, there is provided a lamp with an integrated ballast circuit having an integrated dimming control configured to adjust the brightness of the lamp.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A ballast circuit comprising:
   a resonant load circuit comprising an input electrically coupled to a gas discharge lamp; and
   a resonant control circuit coupled to the input of the resonant load circuit and configured to convert a dc signal to an ac signal and to provide the ac signal to the input of the resonant load circuit, wherein the resonant control circuit comprise a first resonant control inductor and a variable resistor configured in parallel with the first resonant control inductor to adjust a switching frequency of the ballast circuit and wherein the resonant control circuit further comprises a first switch coupled to a second switch at a common node and wherein a gate of the first switch is coupled to a gate of the second switch at a control node.

2. The ballast circuit, as set forth in claim 1, wherein the resonant load circuit comprises a resonant inductor coupled in series between the input of the resonant load circuit and the gas discharge lamp.

3. The ballast circuit, as set forth in claim 1, wherein the resonant load circuit comprises a resonant capacitor coupled in parallel with the lamp.

4. The ballast circuit, as set forth in claim 1, wherein the gates of the first switch and the second switch are coupled together at the control node through respective resistors.

5. The ballast circuit, as set forth in claim 1, wherein the first switch and the second switch comprise complementary-type switching devices.

6. The ballast circuit, as set forth in claim 1, wherein the resonant control circuit comprises a clamp coupled between the common node and the control node and configured to clamp a positive and negative transitions of a gate-to-source voltage of each of the first switch and the second switch to predetermined voltage levels.

7. The ballast circuit, as set forth in claim 1, wherein the resonant control circuit further comprises a resonant control capacitor coupled between the common node and the control node.

8. The ballast circuit, as set forth in claim 7, wherein the resonant control circuit further comprises a driving inductor coupled in series with the first resonant control inductor between the common node and the control node, wherein the first resonant control inductor and the resonant control capacitor are configured to add phase lag to a voltage across the driving inductor, thereby lowering the switching frequency of the ballast circuit.

9. The ballast circuit, as set forth in claim 8, wherein the resonant control circuit further comprises a fixed resistor coupled in series with the variable resistor such that the first resonant control inductor is coupled in parallel with the combination of the variable resistor and the fixed resistor, wherein the fixed resistor is configured to limit a maximum switching frequency of the ballast circuit.

10. The ballast circuit, as set forth in claim 8, wherein the resonant control circuit further comprises an inductor coupled in series between the first resonant control inductor and the control node and not in parallel with the variable resistor, wherein the inductor is configured to limit a maximum switching frequency of the ballast circuit.

11. The ballast circuit, as set forth in claim 1, wherein each of the first switch and the second switch comprises an n-channel device.

12. The ballast circuit, as set forth in claim 1, wherein the resonant control circuit further comprises:
   a first clamp coupled between a source of the first switch and a gate of the first switch; and
   a second clamp coupled between a source of the second switch and a gate of the second switch,
   wherein each of the clamps is configured to clamp positive and negative transitions of gate-to-source voltages of a respective one of the first switch and the second switch to predetermined voltage levels.

13. The ballast circuit, as set forth in claim 1, wherein the resonant control circuit further comprises:
   a first resonant control capacitor coupled between a source of the first switch and the gate of the first switch; and
   a second resonant control capacitor coupled between a source of the second switch and the gate of the second switch.

14. The ballast circuit, as set forth in claim 13, wherein the resonant control circuit further comprises:
   a first driving inductor configured between the source of the first switch and the gate of the first switch and coupled in series with the first resonant control inductor; and
   a second resonant control inductor coupled in series with a second driving inductor between the source of the second switch and the gate of the second switch,
   wherein the first resonant control inductor is tightly coupled to the second resonant control inductor, and
   wherein each of the first and second resonant control inductors and each of the first and second resonant control capacitors is configured to add phase lag to a voltage across a respective one of the first driving inductor and the second driving inductor, thereby lowering the switching frequency of the ballast circuit.

15. The ballast circuit, as set forth in claim 14, wherein the variable resistor is coupled in parallel with the second resonant control inductor.

16. The ballast circuit, as set forth in claim 15, wherein the resonant control circuit further comprises a third resonant control inductor magnetically coupled with each of the first resonant control inductor and the second resonant control inductor, wherein the third resonant control inductor is galvanically isolated from each of the first and second resonant control inductors and wherein the variable resistor is electrically coupled in parallel with the third resonant control inductor.

17. A gas lamp comprising:
   one or more bulbs;
   a ballast circuit coupled to the one or more bulbs and comprising:
      a resonant load circuit comprising an input electrically coupled to the one or more bulbs; and
      a resonant control circuit coupled to the input of the resonant load circuit and configured to convert a dc signal to an ac signal and to provide the ac signal to the input of the resonant load circuit, wherein the resonant control circuit comprises a first resonant control inductor and a variable resistor configured in parallel with the first resonant control inductor to adjust the switching frequency of the ballast circuit;
   an adjustable knob coupled to the variable resistor and configured to adjust the variable resistor; and
   a stem configured to fit into a conventional light socket.

18. The gas lamp, as set forth in claim 17, wherein the resonant load circuit comprises a resonant inductor coupled in series between the input of the resonant load circuit and the one or more bulbs.

19. The gas lamp, as set forth in claim 17, wherein the resonant load circuit comprises a resonant capacitor coupled in parallel with the one or more bulbs.

20. The gas lamp, as set forth in claim 17, wherein the resonant control circuit further comprises a first switch coupled to a second switch at a common node and wherein a gate of the first switch is coupled to a gate of the second switch at a control node.

21. The gas lamp, as set forth in claim 20, wherein the gates of the first switch and the second switch are coupled together at a control node through respective resistors.

22. The gas lamp, as set forth in claim 20, wherein the first switch and the second switch comprise complementary-type switching devices.

23. The gas lamp, as set forth in claim 20, wherein the resonant control circuit further comprises a clamp coupled between the common node and the control node and configured to clamp the positive and negative transitions of gate-to-source voltage of each of the first switch and the second switch to predetermined voltage levels.

24. The gas lamp, as set forth in claim 20, wherein the resonant control circuit further comprises a resonant control capacitor coupled between the common node and the control node.

25. The gas lamp, as set forth in claim 24, wherein the resonant control circuit further comprises a driving inductor coupled in series with the first resonant control inductor between the common node and the control node, wherein the first resonant control inductor and the resonant control capacitor are configured to add phase lag to a voltage across the driving inductor, thereby lowering the switching frequency of the ballast circuit.

26. The gas lamp, as set forth in claim 25, wherein the resonant control circuit further comprises a fixed resistor coupled in series with the variable resistor such that the first resonant control inductor is coupled in parallel with the combination of the variable resistor and the fixed resistor, wherein the fixed resistor is configured to limit the maximum switching frequency of the ballast circuit.

27. The gas lamp, as set forth in claim 25, wherein the resonant control circuit further comprises an inductor coupled in series between the first resonant control inductor and the control node and not in parallel with the variable resistor, wherein the inductor is configured to limit a maximum switching frequency of the ballast circuit.

28. The gas lamp, as set forth in claim 17, wherein the resonant control circuit further comprises a first switch coupled to a second switch at a common node.

29. The gas lamp, as set forth in claim 28, wherein each of the first switch and the second switch comprises an n-channel device.

30. The gas lamp, as set forth in claim 28, wherein the resonant control circuit further comprises:
   a first clamp coupled between a source of the first switch and a gate of the first switch;
   a second clamp coupled between a source of the second switch and a gate of the second switch,
   wherein each of the clamps is configured to clamp the positive and negative transitions of gate-to-source voltages of a respective one of the first switch and the second switch to predetermined voltage levels.

31. The gas lamp, as set forth in claim 28, wherein the resonant control circuit comprises:
   a first resonant control capacitor coupled between a source of the first switch and a gate of the first switch; and
   a second resonant control capacitor coupled between a source of the second switch and a gate of the second switch.

32. The gas lamp, as set forth in claim 31, wherein the resonant control circuit further comprises:

a first driving inductor configured between the source of the first switch and the gate of the first switch and coupled in series with the first resonant control inductor; and a second resonant control inductor coupled in series with a second driving inductor between the source of the second switch and the gate of the second switch, wherein the first resonant control inductor is tightly coupled to the second resonant control inductor, and wherein each of the first and second resonant control inductors and each of the first and second resonant control capacitors is configured to add phase lag to a voltage across a respective one of the first driving inductor and the second driving inductor, thereby lowering the switching frequency of the ballast circuit.

33. The gas lamp, as set forth in claim 32, wherein the variable resistor is coupled in parallel with the second resonant control inductor.

34. The gas lamp, as set forth in claim 33, wherein the resonant control circuit further comprises a third resonant control inductor magnetically coupled with each of the first resonant control inductor and the second resonant control inductor, wherein the third resonant control inductor is galvanically isolated from each of the first and second resonant control inductors and wherein the variable resistor is electrically coupled in parallel with the third resonant control inductor.

35. A system comprising:

a means for adjusting a switching frequency of a resonant control circuit to produce an ac signal having an adjusted switching frequency, wherein the resonant control circuit includes a variable resistor coupled in parallel with a resonant control inductor in the resonant control circuit, wherein the means for adjusting the switching frequency comprises two non-complementary switches; and a means for applying the signal having an adjusted switching frequency to a resonant load circuit, wherein the resonant load circuit comprises a lamp.

36. The system, as set forth in claim 35, comprising a means for limiting a maximum switching frequency of the resonant control circuit.

37. The system, as set forth in claim 36, wherein the means for limiting the maximum switching frequency comprises a fixed resistor coupled in series with the variable resistor, wherein the combination of the fixed resistor and the variable resistor is coupled in parallel with the resonant control inductor.

38. The system, as set forth in claim 36, wherein the means for limiting the maximum switching frequency comprises an inductor coupled in series with each of the resonant control inductor and the variable resistor.

39. The system, as set forth in claim 35, wherein the means for adjusting the switching frequency comprises two complementary switches.

40. A method of manufacturing a ballast circuit comprising:

(a) providing a resonant control circuit comprising two non-complementary switches and having a variable resistor coupled in parallel with a resonant control inductor configured to adjust a switching frequency of the resonant control circuit; and (b) providing a resonant load circuit configured to receive an ac signal from the resonant control circuit, wherein the ac signal has an adjusted switching frequency, and further configured to control an lumen output of a lamp in response to the ac signal.

41. The method of manufacturing, as set forth in claim 40, wherein providing a resonant control circuit comprises providing a resonant control circuit having a variable resistor coupled in series with a fixed resistor, wherein a combination of the variable resistor and the fixed resistor is coupled in parallel with a resonant control inductor.

42. The method of manufacturing, as set forth in claim 41, comprising providing a means for limiting a maximum switching frequency of the resonant control circuit.

43. The method of manufacturing, as set forth in claim 42, wherein providing a means for limiting comprises providing a fixed resistor coupled in series with the variable resistor for limiting a maximum switching frequency of the resonant control circuit.

44. The method of manufacturing, as set forth in claim 42, wherein providing a means for limiting comprises providing an inductor coupled in series with the resonant control inductor.

45. The method of manufacturing, as set forth in claim 40, wherein providing a resonant control circuit comprises providing a resonant control circuit comprising two complementary switches.

* * * * *

UNITED STATES PATENT AND TRADEMARK OFFICE
CERTIFICATE OF CORRECTION

PATENT NO. : 6,815,908 B2
DATED : November 9, 2004
INVENTOR(S) : John S. Glaser et al.

It is certified that error appears in the above-identified patent and that said Letters Patent is hereby corrected as shown below:

Title page,
Item [73], Assignee, please add, -- Assignee: General Electric Company Schenectady, NY (US) --

Column 1,
Line 4, please add -- STATEMENT REGARDING FEDERALLY SPONSORED RESEARCH & DEVELOPMENT
This invention was made with Government support under contract number DE-FC26-99FT40630. The Government has certain rights in the invention. --

Signed and Sealed this

Seventeenth Day of May, 2005

JON W. DUDAS
*Director of the United States Patent and Trademark Office*